(12) United States Patent
Menon et al.

(10) Patent No.: US 8,488,661 B2
(45) Date of Patent: Jul. 16, 2013

(54) SYSTEMS AND METHODS FOR DATA STREAMING

(75) Inventors: Vinod K. Menon, Elkridge, MD (US);
Olufemi Olumoko, Laurel, MD (US);
Omoniyi Segun, Odenton, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1189 days.

(21) Appl. No.: 12/138,843

(22) Filed: Jun. 13, 2008

(65) Prior Publication Data

US 2009/0310663 A1 Dec. 17, 2009

(51) Int. Cl.
*H04B 3/46* (2006.01)

(52) U.S. Cl.
USPC .......... 375/225; 375/240.01; 375/240.12; 375/240.26; 375/E7.035; 375/E7.049; 370/252; 370/278; 370/282; 370/474; 370/476; 370/232; 370/233; 370/234; 709/232; 709/233; 709/234; 709/235; 709/236; 709/237; 709/223; 709/224; 709/225; 709/226; 709/227; 709/228; 709/229

(58) Field of Classification Search
USPC .......... 375/225, 240.01, 240.12, 240.26, 375/E7.035, E7.049; 370/352, 395, 395.41, 370/395.43, 412, 428, 468, 505, 516, 130, 370/232–234, 252, 278, 282, 474, 476; 709/223–237, 130, 252, 278, 282, 474, 476, 709/201–203; 710/1, 4, 52, 54, 57, 65; 725/87, 725/95
See application file for complete search history.

(56) References Cited

U.S. PATENT DOCUMENTS

| | | | | |
|---|---|---|---|---|
| 6,134,596 A | * | 10/2000 | Bolosky et al. | 709/233 |
| 6,138,221 A | * | 10/2000 | Korst et al. | 711/167 |
| 6,205,525 B1 | * | 3/2001 | Korst | 711/154 |
| 6,765,873 B1 | * | 7/2004 | Fichou et al. | 370/235 |
| 7,411,901 B1 | * | 8/2008 | Alexander et al. | 370/230 |
| 7,483,489 B2 | * | 1/2009 | Gentric et al. | 375/240.26 |
| 7,948,906 B1 | * | 5/2011 | Patel et al. | 370/252 |
| 2002/0065074 A1 | * | 5/2002 | Cohn et al. | 455/422 |
| 2004/0143849 A1 | * | 7/2004 | Costa | 725/95 |
| 2004/0250286 A1 | * | 12/2004 | Fraser et al. | 725/89 |
| 2005/0021830 A1 | * | 1/2005 | Urzaiz et al. | 709/234 |
| 2005/0152848 A1 | * | 7/2005 | Patton et al. | 424/46 |
| 2005/0172028 A1 | * | 8/2005 | Nilsson et al. | 709/231 |
| 2006/0045138 A1 | * | 3/2006 | Black et al. | 370/516 |
| 2006/0050743 A1 | * | 3/2006 | Black et al. | 370/516 |
| 2007/0121678 A1 | * | 5/2007 | Brooks et al. | 370/505 |
| 2008/0022005 A1 | * | 1/2008 | Wu et al. | 709/231 |
| 2008/0205442 A1 | * | 8/2008 | El Kolli et al. | 370/468 |

OTHER PUBLICATIONS

Wang et al., Supporting Video Data in Wireless Sensor Networs, Multimedia, 2007. ISM. Ninth IEEE International Symposium on, 2007, pp. 310-317.*
3GPP TS 26.234, Sep. 2009, V9.0.0.*

* cited by examiner

*Primary Examiner* — Daniel Washburn
*Assistant Examiner* — Rahel Guarino (57) ABSTRACT

A method performed by a network device may include determining a transmission bit rate associated with a content, determining a bit rate of a network, determining a number of data streams to be transmitted through the network based on the determined bit rate, where a combined bit rate of the number of data streams is equal to or greater than the determined transmission bit rate, receiving the number of data streams transmitted through the network and reassembling the number of data streams to provide a single data stream of the content.

20 Claims, 7 Drawing Sheets

SYSTEMS AND METHODS FOR DATA STREAMING

BACKGROUND INFORMATION

Commonly, there are a variety of methods of streaming data from one device to another. One method involves streaming data from a device, and when enough data has been received, the data may be provided to a user. Another method involves providing data to a user in a more real-time basis. These methods have drawbacks however, as the first method produces long wait times before providing data to the user, while the second method usually provides poor quality data as changing network conditions may affect real-time connections between devices.

BRIEF DESCRIPTION OF THE DRAWINGS

Reference is made to the attached drawings, wherein elements having the same reference number designation may represent like elements throughout.

DETAILED DESCRIPTION OF PREFERRED EMBODIMENTS

The following detailed description refers to the accompanying drawings. The same reference numbers in different drawings identify the same or similar elements. Also, the following detailed description does not limit the systems and methods described herein. Instead, the scope of the systems and methods are defined by the appended claims and equivalents.

Figure 1:
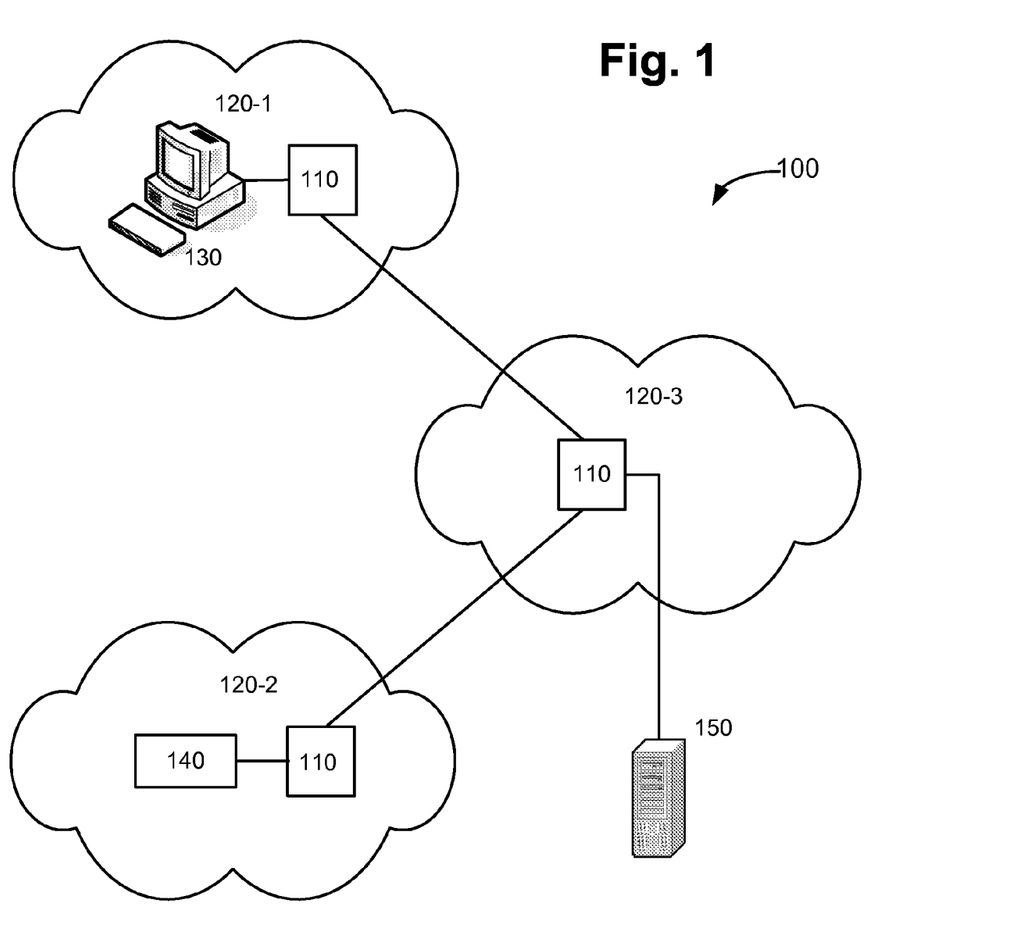
FIG. 1 is a diagram of an exemplary system in which methods and systems described herein may be implemented.

FIG. 1 is a diagram of an exemplary system 100 in which methods and systems described herein may be implemented. System 100 may include routers 110 (hereinafter collectively referred to as routers 110), networks 120-1 to 120-3 (hereinafter collectively referred to as networks 120), computer 130, client device 140, and server 150. It should be understood that system 100 may include any number of additional devices and/or networks.

Routers 110 may include devices for performing network-related functions. For example, each of routers 110 may include a switch and/or logic for receiving and forwarding data from one network device, such as computer 130, client device 140 and server 150, to another network device.

Networks 120 may include one or more networks or subnetworks including an Internet Protocol (IP) network, a telephone network, such as the Public Switched Telephone Network (PSTN), a wide area network (WAN) or a metropolitan area network (MAN). Networks 120 may also include a modem or an Ethernet interface, for example. Routers 110, computer 130, client device 140 and server 150 may communicate over networks 120 using, for example IP Protocols. Networks 120 may also include devices such as switches, routers, firewalls, gateways, and/or servers (not shown) to transmit/receive and route data to/from the connected network devices. Networks 120 may be a hardwired network using wired conductors and/or optical fibers and/or may be a wireless network using free-space optical and/or radio frequency (RF) transmission paths. Implementations of network 120 and/or devices operating in network 120 described herein are not limited to any particular data type, and/or protocol.

Computer 130 may include one or more processors or microprocessors enabled by software programs to perform functions, such as data storage and transmission, data streaming and interfacing with other computers 130 (not shown), client device 140 and server 150, for example. Computer 130 may include software to enable communications over networks 120 and/or other networks, such as the Internet. Computer 130 may also include a data storage memory, such as a random access memory (RAM) or another dynamic storage device that stores information. Computer 130 may also include one or more input devices, such as a keyboard for entering data, a mouse for selecting data or pointing to data, and one or more output devices, such as display or monitor for outputting information to a user.

Client device 140 may include any type of end user device that may transmit and/or receive data streams over one or more networks. For example, client device 140 may include a set top box, a telephone, or a personal digital assistant (PDA).

Server 150 may include one or more processors or microprocessors enabled by software programs to perform functions, such as data storage and transmission (data streaming), and interface with computers 130 and client devices 140, for example. Server 150 may also include a data storage memory, such as a random access memory (RAM) or another dynamic storage device that stores information and/or media for streaming, as described in detail below. Server 150 may also include a communication interface that may include any transceiver-like mechanism that enables server 150 to communicate with other devices and/or systems. In addition, server 150 may include other mechanisms for communicating data via a network, such as a wireless network, for example.

Figure 2:
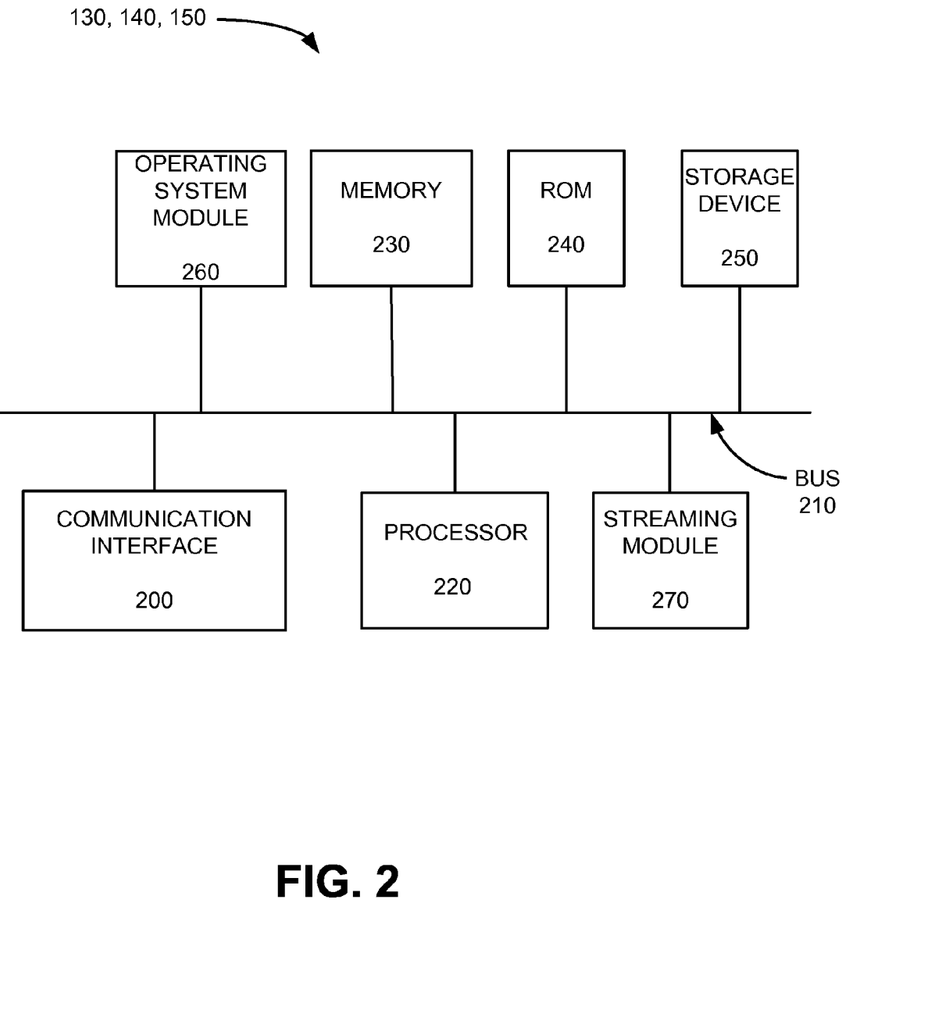
FIG. 2 is a diagram of the exemplary network devices shown in FIG. 1.

FIG. 2 is a diagram of an exemplary configuration of components within network devices, such as computer 130, client device 140 and server 150. Network devices 130, 140 and 150 may include communication interface 200, bus 210, processor 220, memory 230, read only memory (ROM) 240, storage device 250, operating system module 260 and streaming module 270. In some implementations, streaming module 270 may be included in computer 130 and client device 140 and may not be included in server 150. Bus 210 permits communication among the components of network devices 130, 140 and 150. Network devices 130, 140 and 150 may also include one or more power supplies (not shown). One skilled in the art would recognize that network devices 130, 140 and 150 may be configured in a number of other ways and may include other or different elements.

Communication interface 200 may include communication mechanisms that enable network devices 130, 140 and 150 to communicate with other devices and/or systems. For example, communication interface 200 may include a modem or an Ethernet interface to a WAN or LAN. In addition, communication interface 200 may include other mechanisms for communicating via a network, such as a wireless network. Communication interface 200 may also include transmitters/receivers for communicating data to/from other network devices 130, 140 and 150, for example.

Processor 220 may include any type of processor or microprocessor that interprets and executes instructions. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Operating system module 260 may include memories for storing one or more operating systems. For example, operating system module 260 may store operating systems such as Windows, Linux, Unix and Lynx, for example. In this manner operating system module 260 may provide an operating system for network devices 130, 140 and 150 and may allow interfacing with another network device (130, 140 and 150), using another operating system, for example.

Streaming module 270 may include one or more memories to store imaging data or other data that may include applications used by a computer 130 and client device 140. Streaming module 270 may also include logic and/or programs used to transmit/receive information and data to/from server 150, for example. An exemplary streaming module 270 that may be included in computer 130 and client device 140 is described below with reference to FIG. 3.

According to an exemplary implementation, computer 130 and/or client device 140 may perform various processes in response to processor 220 executing sequences of instructions contained in memory 230 and/or streaming module 270. Such instructions may be read into memory 230 and/or streaming module 270 from another computer-readable medium, such as storage device 250, or from a separate device via communication interface 200. It should be understood that a computer-readable medium may include one or more memory devices. Execution of the sequences of instructions contained in memory 230 and/or streaming module 270 causes processor 220 to perform the acts that will be described hereafter. In alternative embodiments, hard-wired circuitry may be used in place of or in combination with software instructions to implement aspects of the embodiments. Thus, the systems and methods described are not limited to any specific combination of hardware circuitry and software.

Figure 3:
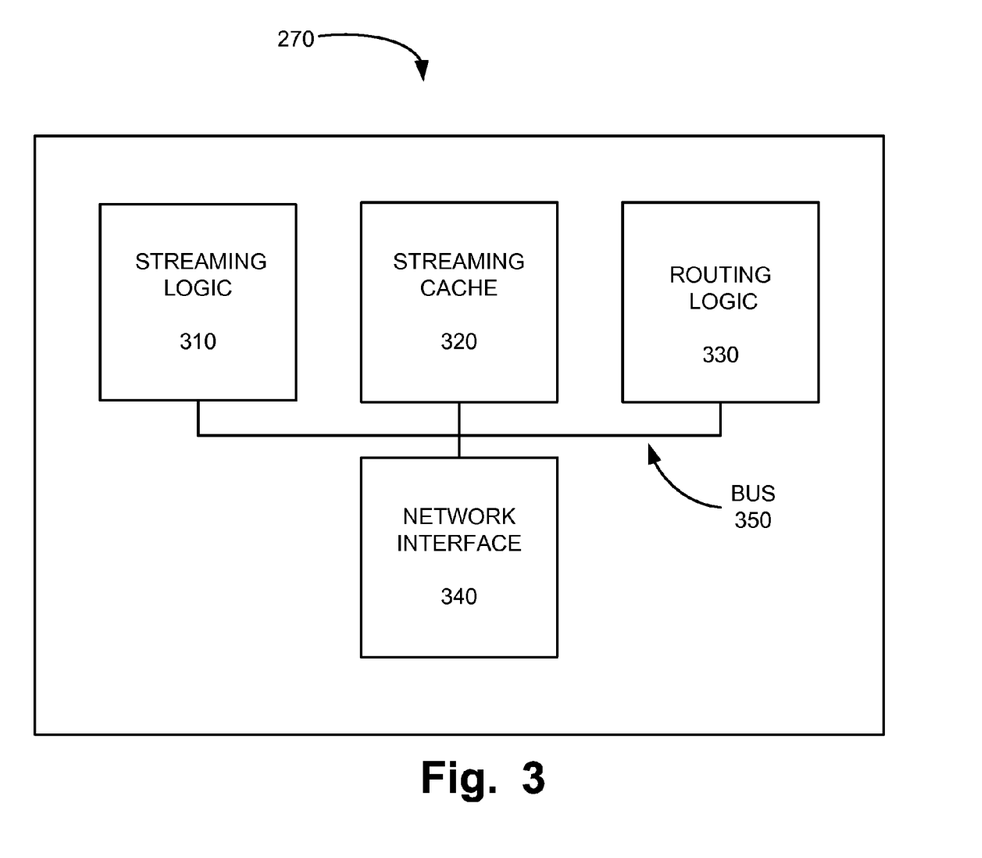
FIG. 3 is a diagram of an exemplary streaming module within a device shown in FIG. 1.

FIG. 3 is a diagram of exemplary components of streaming module 270 within computer 130 and/or client device 140. As shown in FIG. 3, streaming module 270 may include streaming logic 310, streaming cache 320, routing logic 330, network interface 340 and bus 350. As shown, streaming logic 310, streaming cache 320, routing logic 330 and network interface 340 may be interconnected via bus 350.

Streaming logic 310 may include hardware and software for controlling data streaming processes. For example, streaming logic 310 may include a RAM, ROM, and/or another type of memory used to store data streaming software applications. For example, a data streaming software application contained in streaming logic 310 may include instructions for instigating or initiating a data streaming process (from computer 130 to server 150) by communicating with server 150 to determine a transmission bit rate obtainable from server 150, and may include instructions to perform a bit rate test to determine a bit rate of a data stream(s) that may be transmitted through network(s) 120. Streaming logic 310 may also include algorithms for determining the number of data streams through network(s) 120 required to provide the transmission rate to/from server 150. For example, if server 150 transmits a particular media stream at 5 megabytes per second (5 Mb/s) and the determined bit rate of a data stream through networks 120 is 1 Mb/s, streaming logic 310 may determine that 5 data streams are required to transmit (stream) the media from server 150 to computer 130.

Additionally, streaming logic 310 may change variables within a data streaming process based on determined conditions. For example, if the bit rate of data stream(s) decreases (due to network traffic increases), streaming logic 310 may determine that additional data stream(s) may be required to provide the transmission bit rate between server 150 and computer 130. Streaming logic 310 may also change a block size of data requested and transmitted from server 150 based on an amount of data stored in streaming cache 320. For example, streaming logic 310 may request data blocks from server 150 where the size of a data block may range from 50 kilobytes (50 Kb) to 2 megabytes (2 Mb). Streaming logic 310 may request smaller data blocks (e.g., 50 Kb) from server 150 when the amount of data stored in streaming cache 320 is below a first threshold amount (when a data streaming process begins), as smaller data blocks may be received, processed and provided to a user more quickly. After a streaming process has begun and more than a second threshold amount of data is stored in streaming cache 320, streaming logic 310 may request larger data blocks (e.g., 2 Mb) from server 150. In this example, the overall throughput (bit rate) of a data stream is greater when larger data blocks are transmitted from server 150. However, as larger data blocks take longer to receive and process than smaller blocks, larger blocks may be requested by streaming logic 310 when there is adequate time (determined by the amount of data stored in streaming cache 320 yet to be provided to a user) to receive and process larger data blocks.

Streaming cache 320 may include logic and one or more memories for receiving and storing data. For example, streaming cache 320 may receive a number of data streams from server 150 and reassemble the number of received data streams into a single data stream. For example, streaming cache 320 may receive data blocks from server 150 where the order of the data block may be received from streaming logic 310. Streaming cache 320 may then order the received data blocks to be stored in a sequential manner, so as to produce a single data stream when read from streaming cache 320. Streaming cache 320 may also monitor the received bit rates of data streams and/or the amount of data stored in streaming cache 320 to determine if a data streaming variable may be changed.

Routing logic 330 may include hardware and/or software for routing and/or communicating information over one or more networks. For example, routing logic 330 may contain information, such as a routing table, used to identify, address and/or communicate with network devices 130, 140 and 150 via networks 120.

Network interface 340 may include hardware and/or software for interfacing and/or communicating over one or more networks 120. For example, network interface 340 may contain interfacing hardware such as an Ethernet card, a modem interface, a PIC card, etc., which may allow network interface 340 to transmit/receive data via any type of network 120.

Figure 4:
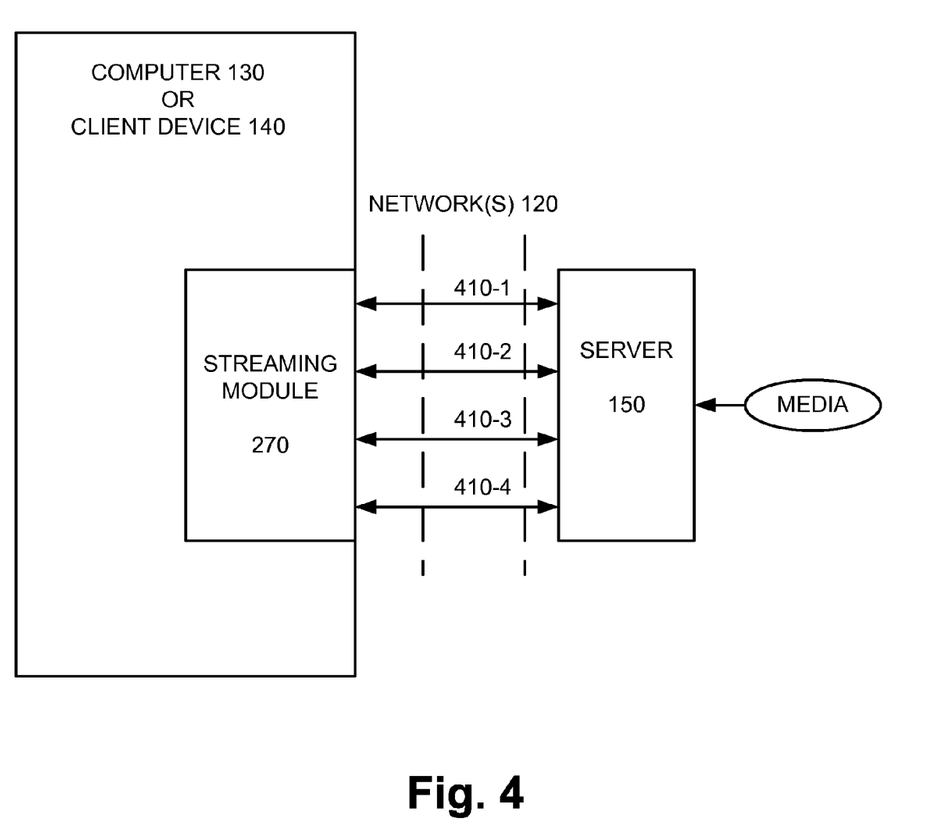
FIG. 4 is a diagram of an exemplary streaming process performed by the devices shown in FIG. 1.

FIG. 4 is a diagram illustrating the devices of FIG. 1 performing data streaming. As shown in FIG. 4, a computer 130 or client device 140, which includes streaming module 270 may transmit/receive a number of data streams 410-1 to 410-4

(hereinafter referred to as data streams 410) to/from server 150. Data streams 410 are described below with reference to FIGS. 5A and 5B.

Figure 5A:
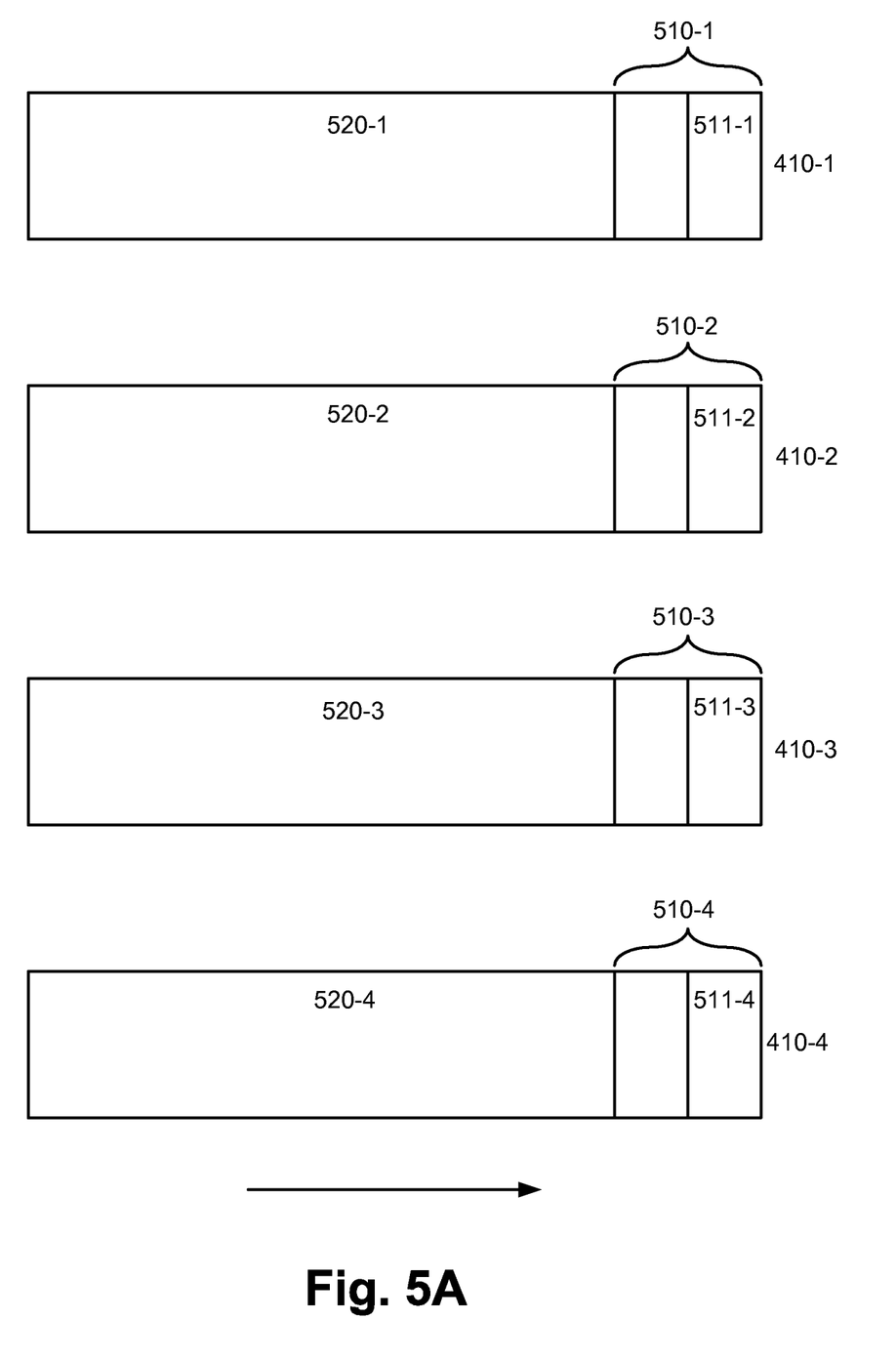
FIGS. 5A and 5B are diagrams of exemplary data streams as shown in FIG. 4.
Figure 5B:
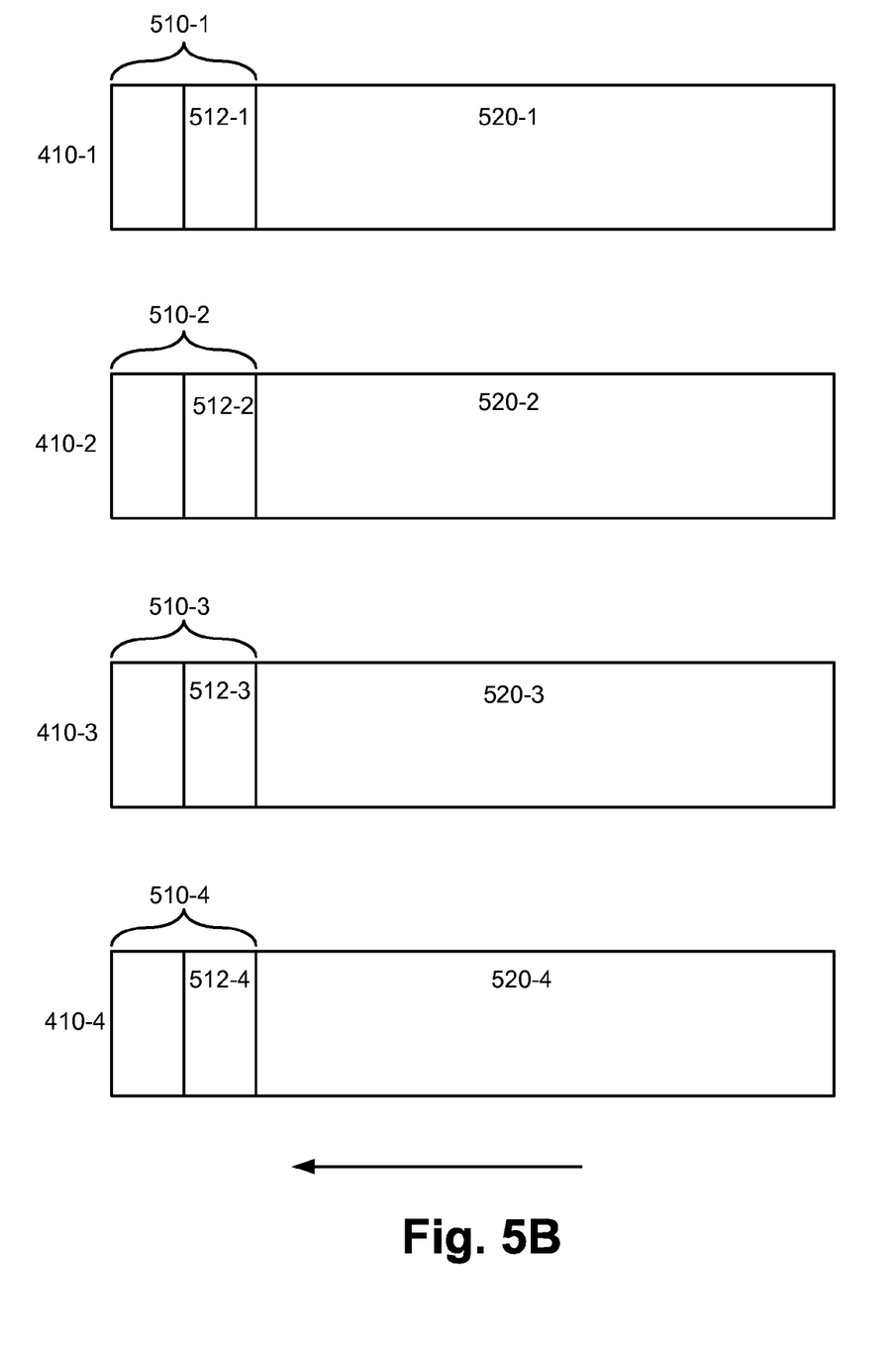

FIGS. 5A and 5B are diagrams of exemplary data streams as shown in FIG. 4. FIG. 5A shows data streams 410 from computer 130 to server 150. FIG. 5B shows data streams 410 transmitted from server 150 to computer 130. Each of data streams 410-1 to 410-4 includes a header portion 510 and a payload portion 520, as described in detail below.

Header portion 510 (as shown in FIG. 5A) may include information such as an IP address of server 150, an IP address of computer 130 and other standard information in accordance with HTTP protocols, for example. Header portion 510 may also include range information 511 that may identify a specific bit range of data. For example, if 4 Mb of data is being requested over four data streams, each stream may request a specific range of the 4 Mb of the data. Continuing with this example, range information 511-1 (included in data stream 410-1) may request the first Mb of data (bit range 0-1M), range information 511-2 (included in data stream 410-2) may request the second Mb of data (bit range 1M-2M), range information 511-3 (included in data stream 410-3) may request the third Mb of data (2M-3M) and range information 511-4 (included in data stream 410-4) may request the fourth Mb of data (bit range 3M-4M). Range information 511 may be determined by streaming logic 310.

Payload portion 520 may include information and/or data that may be communicated to server 150. It should be understood that when requesting data from server 150, there may be minimal data and/or information included in payload portion 520 transmitted from computer 130, as to reduce the amount of transmitted data, and reserve bandwidth for data streaming from server 150 (as shown in FIG. 5B).

Header portion 510 (as shown in FIG. 5B) may include information such as an IP address of server 150, an IP address of computer 130 and other standard information in accordance with HTTP protocols, for example. Header portion 510 may also include content length information 512 that may identify the size of a data block (i.e. the amount of data included in payload portion 520). For example, if 4 Mb of data is being streamed from server 150 via four data streams 410, each stream may include 1 Mb of the data in payload portion 520, where content length information 512 may indicate "1 Mb" for each data stream 410.

Payload portion 520 (as shown in FIG. 5B) may include information and/or data that may be transmitted/streamed from to server 150. Continuing with the example above, content length information 512-1 (included in data stream 410-1) may indicate that the size of the data block included in payload portion 520-1 is 1 Mb. Similarly, content length information 512 in data streams 410-2 to 410-4 may indicate data block sizes of 1 Mb are included in payload portions 520-2 to 520-4. In this example, the data included in the payload portions 520 corresponds to the data block sizes requested by computer 130, as shown in FIG. 5A. For example, data in payload 520-1 includes the first Mb of data (bit range 0-1M), data in payload 520-2 (included in data stream 410-2) includes the second Mb of data (bit range 1M-2M), data in payload 520-3 (included in data stream 410-3) includes the third Mb of data (2M-3M) and data in payload 520-4 (included in data stream 410-4) includes the fourth Mb of data (bit range 3M-4M).

Figure 6:
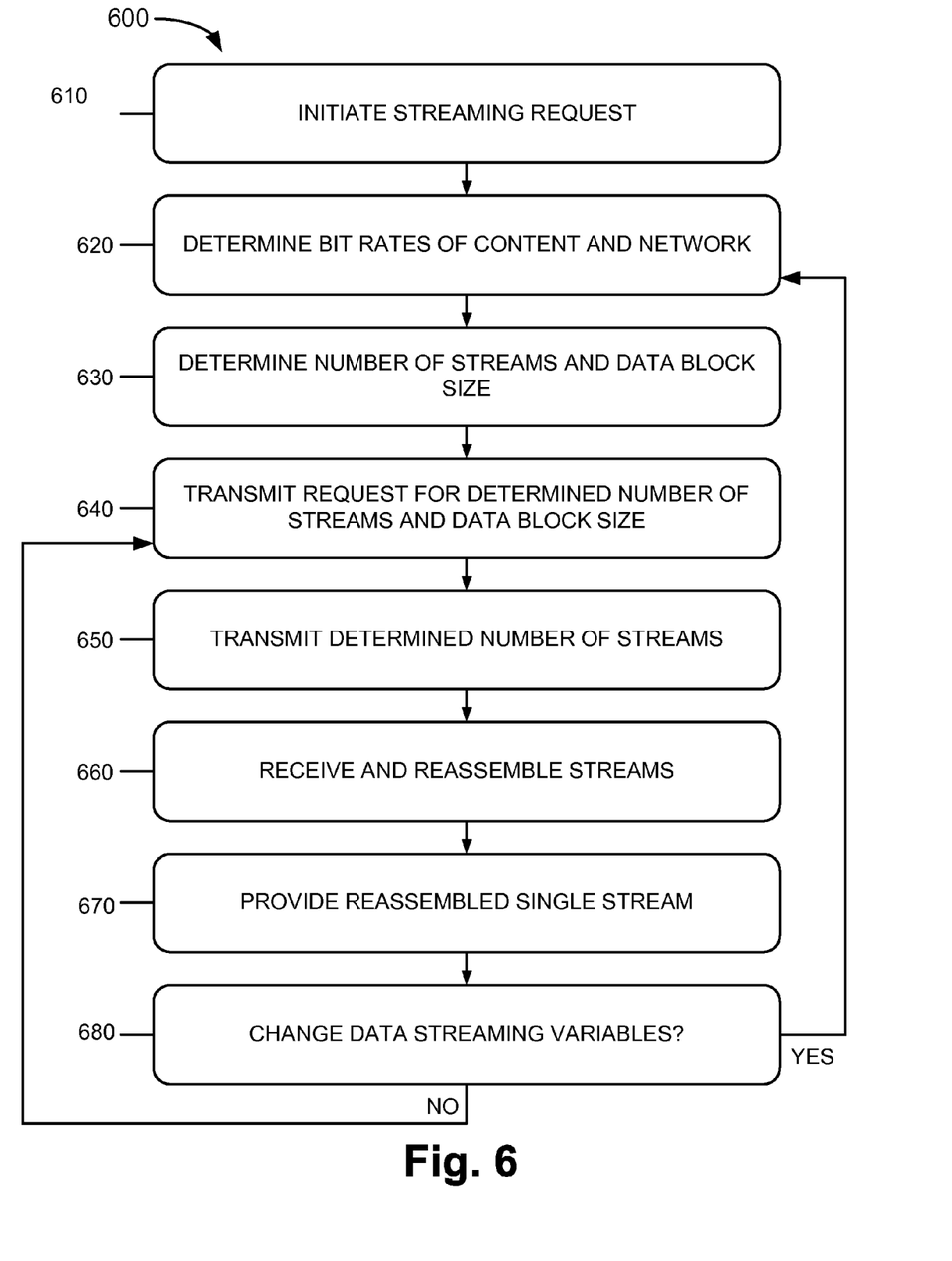
FIG. 6 is a flow diagram illustrating an exemplary data streaming process.

FIG. 6 illustrates an exemplary data streaming process 600. Processing may begin by initiating a streaming request (block 610). For example, a user of computer 130 may wish to stream a web-cast video presentation which may be transmitted from server 150 via networks 120. A user may click on a link, for example, related to the web-cast, which may initiate the streaming process (block 610). In response to instigation or initiation of the streaming process, routing logic 330 and network interface 340 may establish a connection between computer 130 and server 150. For example, once a connection has been established, streaming logic 310 may determine a bit rate of the content to be streamed and may determine the bit rate of a data stream 410 through a network (block 620). For example, streaming logic 310 may receive information from server 150 indicating that the web-cast may be streamed at a bit rate of 5 Mb/second. Additionally, streaming logic 310 may perform a bit rate test to determine the obtainable bit rate of a data stream 410 from server 150 to computer 130 via network 120. For example, streaming logic 310 may send a request to server 150 for 100 Kb data block sizes (payload portions 520 as shown in FIG. 5B) and may monitor the bit rate at which the data blocks are received from server 150. Continuing with this example and based on the monitoring, streaming logic 310 may measure or determine that data may be adequately received at a maximum rate of 1.25 Mb/second from server 150 (block 620).

Once the bit rates of the streamed content and the bit rates of data streams 410 through networks 120 have been determined, the number of data streams 410 and the data block sizes may be determined (block 630). For example, if the media is streamed at 5 Mb/second and each data stream 410 may transmit 1.25 Mb/second, streaming logic 310 may determine that 4 data streams 410 must be established (by routing logic 330 and network interface 340) between computer 130 and server 150. Streaming logic 310 may also determine that an initial data block size (amount of data included in payload portion 520) may be 50 Kb (block 630).

After these determinations (performed in block 630), computer 130 may transmit a request for the determined number of data streams 410 and the data block sizes (block 640). As described above, a specific range of data may be requested for each data stream 410 by computer 130. For example, range information 511-1 (included in data stream 410-1) may request the first 50 Kb of data (bit range 0-50K) from server 150, range information 511-2 (included in data stream 410-2) may request the second 50 Kb of data (bit range 50K-110K), range information 511-3 (included in data stream 410-3) may request the third 50 Kb of data (100K-150K) and range information 511-4 (included in data stream 410-4) may request the fourth 50 Kb of data (bit range 150K-200K) (block 640). In response to receiving the data streams 410 that include the requested range information 511 in header portions 510, server 150 may transmit data streams to computer 130 (block 650). As described above, each data stream 410 received by computer 130 may include the requested range of data in payload portion 520 from server 150.

Upon reception of payload portions 520 included in data streams 410, the data may be stored for reassembling as a single stream (block 660). For example, streaming logic 310 may communicate to streaming cache 320, information relating to the sequential order of data included in payload portions 520. As described above, the received 50 Kb blocks of data may then be stored in sequential order. For example, streaming cache 320 may order and store the first 200 Kb of received data as, payload 520-1 (50 Kb), payload 520-2 (50 Kb), payload 520-3 (50 Kb) and payload 520-4 (50 Kb).

After being sequentially stored in streaming cache 320, data may be sequentially read from streaming cache 320 to produce a single data stream (block 670). For example, if data stored in streaming cache 320 is a web-cast video presentation, the data may be read and supplied to a video card within computer 130 to provide the web-cast video presentation to a user of computer 130 via a monitor. If the data stored in streaming cache 320 is audio data, the data may be read and supplied to an audio card and outputted via a speaker in computer 130. It is understood that blocks 660 and 670 are simultaneously performed. That is, data included in data streams 410 may be ordered and stored in streaming cache 320 (block 660) while simultaneously providing previously ordered and stored data from streaming cache 320 (block 670).

While simultaneously receiving and providing data from streaming cache 320 (blocks 660 and 670), data streaming variables may be changed (block 680). For example, streaming logic 310 and/or streaming cache 320 may monitor the received bit rates of data streams 410 and/or the amount of data stored in streaming cache 320 and determine if a data streaming variable may be changed. A data streaming variable may include the number of data streams 410, the bit rate of a data stream 410, a data block size included in payload portions 520 of a data stream 410 and the bit rate of data (media) streamed from server 150. If streaming logic 310 determines that data is being simultaneously stored and provided from streaming cache 320 without need for a change of streaming variables (No-in block 680), process 600 returns to block 640 to continue to request and receive data streams 410 as described above.

In one example, streaming logic 310 and/or streaming cache 320 may determine that a data streaming variable should be changed (Yes-in block 680) by monitoring the amount of data stored in streaming cache 320 and determining that data is being provided in a single stream (in block 670) at a rate faster than the rate at which data is being received and stored (in block 660). Continuing with this example, process 600 may return to block 620 to determine bit rates of data streams 410. If for example, server 150 is providing a web-cast at 5 Mb/second and there are four originally established data streams 410 (each originally providing 1.25 Mb/second) and the number of network users on network 120 increases such that each data stream 410 may only be transmitting data at 1 Mb/second, streaming logic 310 may determine that an additional (fifth data stream 410) may be required between computer 130 and server 150 in order to provide the necessary bandwidth of 5 Mb/second (block 630). In this example, a fifth data stream 410 may be established, where process 600 continues to simultaneously receive and provide data into streaming cache 320 using five data streams that each transmit at 1 Mb/second (blocks 660 and 670).

In another example, streaming logic 310 and/or streaming cache 320 may monitor the amount of data stored in streaming cache 320 and determine that a large amount of data is stored in streaming cache 320 and determine that a data streaming variable should be changed (Yes-in block 680). For example, the bit rates of the data streams 410 and the content streamed from server 150 may remain the same (block 620), however a data block size (amount of data included in payload portion 520) may be changed (block 630). For example, range information 511 may request data blocks of 50 Kb at the start of a data streaming process 600 (block 640). As described above, a data stream 410 may provide an increased throughput (bandwidth) by transmitting data in larger blocks. In this example, streaming logic 310 may include range information 511 indicating that data blocks of 1 Mb may be transmitted from server 150 via data streams 410 (block 640). In this manner, once there is a large amount of data stored in streaming cache 320 (e.g., greater then a second threshold amount), the data block size may be changed to allow for more efficient data transfer between computer 130 and server 150 in blocks 650-660. That is, larger blocks of data may be transferred from server 150 to computer 130.

CONCLUSION

Implementations consistent with the systems and methods described herein may establish a number of data streams between two network devices based on bit rates of streamed media and bit rates available through intervening networks. The systems and methods described herein may also monitor and dynamically change variables within the data streaming processes to achieve higher bit rates of transmission and more reliable connections between network devices than previous methods. This may allow high throughput applications, such as video on demand applications and other streaming applications to be efficiently transmitted and processed.

The foregoing description of the embodiments provides illustration and description, but is not intended to be restrictive or to limit implementations to the precise form disclosed. Modifications, additions and variations are possible in light of the above teachings without departing from the broader scope of the embodiments as set forth in the claims that follow.

For example, the embodiments have been described in the context of computers and servers transmitting data over communications networks. The embodiments described herein may be implemented in other devices or systems and/or networks.

Further, while series of acts have been described with respect to FIG. 6, the order of the acts may be varied in other implementations. Moreover, non-dependent acts may be performed in parallel.

It will also be apparent that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code--it being understood that one would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

No element, act, or instruction used in the description of the present application should be construed as critical or essential to the systems and methods described unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein are defined by the claims and their equivalents.

What is claimed is:

1. A method comprising:

determining, by a first network device, a desired transmission bit rate associated with content to be streamed from a second network device;

determining, by the first network device and prior to the content being streamed, a first data stream bit rate for a data stream through a network between the first network device and the second network device;

identifying, by the first network device, a first quantity of data streams through the network based on the desired transmission bit rate and the first data stream bit rate, a first combined bit rate of the first quantity of data streams being equal to or greater than the desired transmission bit rate;

initiating, by the first network device, streaming of first portions of the content on the first quantity of data streams from the second network device, the first portions of the content being streamed at a first block size;

reassembling, in a memory associated with the first network device, the streamed first portions to provide a single data stream;

determining, by the first network device and after streaming of the first portions, a status of the memory;

calculating, by the first network device, at a second block size based on the determined status of the memory;

determining, by the first network device and using the second block size, a second data stream bit rate for a data stream, between the first network device and the second network device, after the streaming of the first portions;

identifying, by the first network device, a second quantity of data streams through the network based on the desired transmission bit rate and the second data stream bit rate, a second combined bit rate of the second quantity of data streams being equal to or greater than the desired transmission bit rate; and initiating, by the first network device, streaming of second portions of the content on the second quantity of data streams from the second network device, the second portions of the content being streamed at the second block size.

2. The method of claim 1, further comprising:

determining, based on the first quantity of data streams, the first block size.

3. The method of claim 1, further comprising:

determining a bit range associated with the first portions of the content.

4. The method of claim 3, where reassembling the streamed first portions further includes:

sequentially storing, in the memory and based on the bit range, data associated with the first portions.

5. The method of claim 1, where calculating the second block size further includes:

calculating the second block size based on an amount of data stored in the memory after reassembling the streamed first portions.

6. A network device, comprising:

a memory; and a processor configured to:

receive information identifying a transmission bit rate associated with content to be streamed from another network device, determine a first bit rate for a data stream through a network prior to streaming the content, determine, based on the first bit rate, a first quantity of data streams from the other network device, a first total bit rate, associated with the first quantity of data streams at the first bit rate, being greater than or equal to the transmission bit rate, initiate streaming of first portions of the content from the other network device via the first quantity of data streams, the first portions of the content being streamed at an initial data block size, store, in the memory, data associated with the first portions of the content, provide, based on the stored data, a single data stream associated with the first portions, determine, after the streaming of the first portions, a status of the memory, calculate, based on the status of the memory and the initial data block size, an updated data block size, determine, based on the updated data block size, a second bit rate for a data stream through the network after streaming the first portions via the first quantity of data streams, determine, based on the second bit rate, a second quantity of data streams from the other network device, a second total bit rate, associated with the second quantity of data streams at the second bit rate, being greater than or equal to the transmission bit rate, and initiate streaming of second portions of the content from the other network device via the second quantity of data streams, the second portions of the content being streamed at the updated data block size.

7. The network device of claim 6, where:

the other network device is a server, and the transmission bit rate is a rate at which the content is transmitted, at a particular quality level, between the network device and the server.

8. The network device of claim 6, where the processor is further configured to:

determine a bit range associated with the first portions of the content.

9. The network device of claim 8, where the processor, when storing the data associated with the first portions of the content, is further configured to:

store, in the memory, the data associated with the first portions of the content in an order, where the order is based on the determined bit range.

10. The network device of claim 6, where the content comprises a video on demand data stream, and where the transmission bit rate is a rate for providing, through the network device, the video on demand stream at a particular quality level.

11. A non-transitory computer-readable medium storing instructions, the instructions comprising:

one or more instructions which, when executed by a processor, cause the processor to establish a first plurality of connections to transmit data between a first network device and a second network device, the first network device being associated with a memory;

one or more instructions which, when executed by the processor, cause the processor to determine an initial data block size used for the data to be transmitted from the second network device and via the first plurality of connections;

one or more instructions which, when executed by the processor, cause the processor to receive the data transmitted from the second network device via the first plurality of connections, the data being transmitted at the initial data block size;

one or more instructions which, when executed by the processor, cause the processor to store the received data in the memory,
the received data being stored in an order based on a bit range associated with the data;
one or more instructions which, when executed by the processor, cause the processor to determine a status of the memory after storing the received data;
one or more instructions which, when executed by the processor, cause the processor to calculate an updated data block size based on the determined status of the memory;
one or more instructions which, when executed by the processor, cause the processor to establish a second plurality of connections to transmit additional data between the first network device and the second network device; and
one or more instructions which, when executed by the processor, cause the processor to instruct the second network device to transmit the additional data via the second plurality of connections and using the updated data block size.

12. The non-transitory computer-readable medium of claim 11, further comprising:
one or more instructions to determine a bit rate at which the data is transmitted on a connection between the first network device and the second network device prior to establishing the first plurality of connections, and
one or more instructions to determine the first plurality of connections based on the determined bit rate and an overall bit rate associated with the data.

13. The non-transitory computer-readable medium of claim 12, where the one or more instructions to determine the first plurality of connections include:
one or more instructions to determine a quantity of connections, in the first plurality of connections, based on the determined bit rate.

14. The non-transitory computer-readable medium of claim 11, where the one or more instructions to determine the status of the memory include:
one or more instructions to monitor a quantity of data stored in the memory.

15. The non-transitory computer-readable medium of claim 14, where the one or more instructions to calculate the updated block size further include:
one or more instructions to modify the initial data block size based on the quantity of data stored in the memory.

16. A method performed in a network device, the method comprising:
receiving, by the network device, data via a first quantity of data streams from another network device;
storing, by the network device, the received data in a memory;
monitoring, by the network device, an amount of the received data stored in the memory; and
determining, by the network device, an updated block size associated with additional data to be received from the other network device based on the amount of the received data stored in the memory,
where determining the updated block size includes:
identifying an initial block size associated with the received data, and
calculating, based on the initial block size and the amount of the received data stored in the memory, the updated block size;
calculating, by the network device and based on the updated block size, a second quantity of data streams from the other network device; and
sending, by the network device and to the other network device, an instruction to send the additional data via the second quantity of data streams and at the updated block size.

17. The method of claim 16, where monitoring the amount of the received data stored in the memory further comprises:
comparing the amount of the received data stored in the memory to a threshold; and
determining a status of the memory based on comparing the amount of the received data to the threshold.

18. The method of claim 17, where the updated block size is smaller than the initial block size when the amount of the received data stored in the memory is less than the threshold, and
where the updated block size is larger than the initial block size when the amount of the received data stored in the memory is more than the threshold.

19. The method of claim 17, where the threshold includes a first threshold and a second threshold that is larger than the first threshold,
where the updated block size is smaller than the initial block size when the amount of the received data, stored in the memory, is less than the first threshold, and
where the updated block size is larger than the initial block size when the amount of the received data, stored in the memory, is greater than the second threshold.

20. The method of claim 16, where the second quantity of data streams is greater than the first quantity of data streams when outgoing data is being read from the memory at a faster rate than incoming data is being stored into the memory.

* * * * *